Jan. 14, 1941.　　　　　A. F. DEMEO　　　　　2,228,344
BATTERY CABLE CLAMP
Filed Sept. 14, 1939
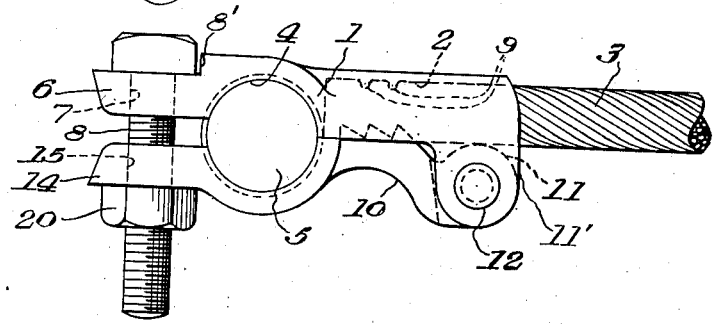
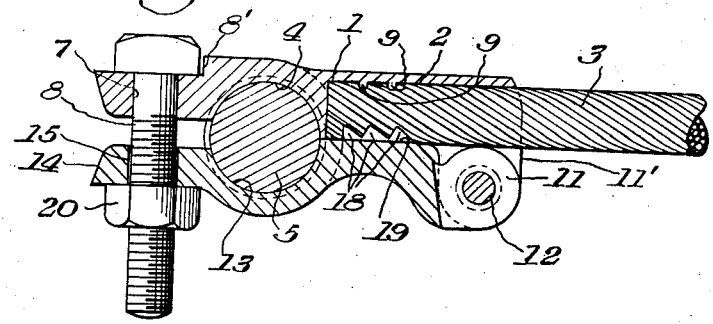
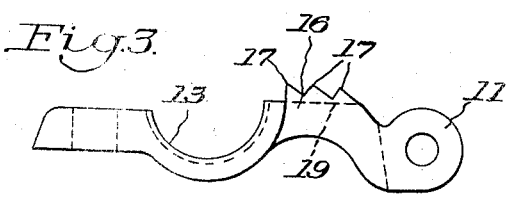
INVENTOR.
Anthony F. Demeo.
BY
ATTORNEY.

Patented Jan. 14, 1941

2,228,344

UNITED STATES PATENT OFFICE 2,228,344

BATTERY CABLE CLAMP

Anthony F. Demeo, Pittsburgh, Pa.

Application September 14, 1939, Serial No. 294,882

2 Claims. (Cl. 173—259)

This invention relates to a terminal clamp for storage batteries such as are generally employed in automobiles. In such installations it is the usual practice to have the ground and live cables clamped to the battery post in a manner which enables them to be readily removed. Frequently, due to corrosion and vibration, the cables break off at the battery clamp and it then becomes necessary to install an entire new cable and new clamp or else solder the cable to the clamp.

It has heretofore been proposed to make so-called solderless clamps embodying gripping means for the cable so that the cable and clamp can be assembled without solder. However, such devices as have heretofore been proposed are of complicated construction, being relatively costly to manufacture, are apt to become separated, or are difficult to assemble in position and accordingly have not gone into commercial use.

According to the present invention I provide a terminal clamp for storage batteries or the like comprising two hinged clamping elements, each having a recess to receive the battery post, and in addition, one of the elements have a recess to receive the cable, and the other element has a portion adapted to grip the cable. Preferably the terminal clamp is secured in position by a bolt which causes the cable to be clamped and the post to be gripped at substantially the same time.

The invention will be described in connection with the accompanying drawing wherein I have shown a preferred embodiment of the invention by way of example, and wherein:

Figure 1 is a plan view showing the battery terminal clamp in assembled position, Figure 2 is a median section through Figure 1, and Figure 3 is an elevation of a detail.

Referring to the drawing, there is shown a clamping element 1 which is shaped to provide a substantially semi-cylindrical recess 2 at one end adapted to receive the end of a braided wire cable 3. A wall 3' limits the amount the cable can extend into the recess to prevent interference with the post gripping mechanism. At its other end the jaw or element 1 has a semi-conical recess 4 adapted to be disposed about the battery post 5. A lug 6 extends from the clamping element and is apertured at 7 to receive a suitable bolt 8, a shoulder 8' being provided to prevent the bolt from turning.

If desired, the walls of the recess 2 may have ribs 9 thereon to assist in gripping the cable to prevent it being pulled out.

The other clamping element or jaw 10 has a pair of perforated lugs 11 at one end adapted to be received between perforated extensions 11' on the element 1, and a suitable hinge pin 12 passes through the extensions 11' and lugs 11 and is riveted or otherwise held in place, whereby the elements 1 and 10 are hinged together. The hinge pin preferably is made of Monel metal, which is resistant to corrosion under the conditions encountered in service. The opposite end of the element 10 has a mating conical recess 13 adapted to be received around the battery post and has a lug 14 with an aperture 15 therethrough.

Intermediate the lugs 11 and conical recess 12 the clamping element 10 is shaped to provide a cable engaging portion 16 which preferably has divided rows of teeth 17 and 18 thereon separated by a groove 19. The clamping jaws or elements 1 and 10 preferably are constructed of brass and are coated with lead in order to reduce or prevent corrosion thereof. The nut 20 is screwed onto the bolt 8 and serves to draw the clamping elements 1 and 10 together.

In assembling the cable and battery clamp to a battery, the bolt 8 is first removed, the hinged clamping elements separated, and the cable 3 inserted in the recess 2, and the hinged clamping elements 1 and 10 then are pressed together until the lugs 6 and 14 are brought close enough together so that the bolt 8 may be passed through the apertures 7 and 15. The clamp is then applied to the conical terminal post 5 of the storage battery, the post being received in the semi-conical recesses 4 and 13. The nut 20 is then screwed unto the bolt 8 and serves to draw the clamping elements 1 and 10 toward each other, thus compressing and gripping the cable 3 into the recess 2 by the teeth 17 and 18. Should the cable be excessively yielding the clamping elements 1 and 10 meet at the rear end of the battery post recess, thus limiting the compression of the cable. The nut is tightened until the cable and battery post are firmly gripped and held between the teeth 17 and 18 and ribs 9, the engagement of the rear end of the clamping elements preventing bending of the clamp from releasing the battery post or cable. It will thus be apparent that I have provided a terminal battery clamp of simple construction which is easy to apply to the battery cable or the battery post.

As the parts are permanently hinged together they may be easily assembled to the cable and the cable is automatically gripped by the clamps at the same time that the clamp is tightened about the battery post.

What I claim as my invention and desire to secure by Letters Patent is:

1. A terminal clamp for storage batteries comprising two clamping elements, a hinge pin securing together said clamping elements at one end to provide a hinge joint, each element being recessed at the end opposite the hinge joint to receive a battery post, one of the elements having a substantially cylindrical interior recess adjacent the hinge pin extending with its axis longitudinally of said element, and the other element having a cable engaging portion disposed to resist pulling out the cable from the recess, and a bolt at the end opposite the hinge passing through said elements to draw the elements together.

2. A terminal clamp for storage batteries comprising two clamping elements, a hinge pin securing together said clamping elements at one end to provide a hinge joint, each element being recessed at the end opposite the hinge joint to receive a battery post, one of the elements having a substantially cylindrical interior recess adjacent the hinge pin extending with its axis longitudinally of said element, a rib in said recess, and the other element having a cable engaging portion with spaced rows of teeth disposed to resist pulling out the cable from the recess, and a bolt at the end opposite the hinge passing through said elements to draw the elements together.

ANTHONY F. DEMEO.